(12) United States Patent
Lee et al.

(10) Patent No.: US 11,049,240 B2
(45) Date of Patent: Jun. 29, 2021

(54) METHOD AND SYSTEM FOR ASSESSING BONE AGE USING DEEP NEURAL NETWORK

(71) Applicant: HealthHub Co., Ltd., Seoul (KR)

(72) Inventors: Byung Il Lee, Seoul (KR); Sung Hyun Kim, Seongnam-si (KR)

(73) Assignee: HealthHub Co., Ltd., Seoul (KR)

( * ) Notice: Subject to any disclaimer, the term of this patent is extended or adjusted under 35 U.S.C. 154(b) by 33 days.

(21) Appl. No.: 16/420,846

(22) Filed: May 23, 2019

(65) Prior Publication Data

US 2020/0372633 A1 Nov. 26, 2020

(51) Int. Cl.
| | |
|---|---|
| G06T 7/00 | (2017.01) |
| G06T 3/40 | (2006.01) |
| G06K 9/00 | (2006.01) |
| G06N 20/10 | (2019.01) |
| G06N 3/08 | (2006.01) |

(52) U.S. Cl.
CPC ........ *G06T 7/0012* (2013.01); *G06K 9/00523* (2013.01); *G06K 9/00536* (2013.01); *G06N 3/08* (2013.01); *G06N 20/10* (2019.01); *G06T 3/4007* (2013.01); *G06T 2207/10116* (2013.01); *G06T 2207/20084* (2013.01); *G06T 2207/30008* (2013.01)

(58) Field of Classification Search
CPC ................ G06T 2207/30008; G06K 2209/055
USPC .............................. 382/209, 195, 128, 103
See application file for complete search history.

(56) References Cited

U.S. PATENT DOCUMENTS

| | | | |
|---|---|---|---|
| 10,242,293 B2 | 3/2019 | Shim et al. | |
| 10,262,235 B1 | 4/2019 | Chen et al. | |
| 2005/0259882 A1* | 11/2005 | Dewaele | G06T 7/75 |
| | | | 382/243 |
| 2010/0278436 A1* | 11/2010 | Tsai | G06K 9/3258 |
| | | | 382/209 |
| 2016/0314335 A1* | 10/2016 | Al-Kofahi | G06T 7/187 |
| 2019/0332897 A1* | 10/2019 | Chen | G06K 9/00771 |
| 2020/0020097 A1* | 1/2020 | Do | G06K 9/627 |

* cited by examiner

*Primary Examiner* — Kiet M Doan
(74) *Attorney, Agent, or Firm* — Sughrue Mion, PLLC

(57) ABSTRACT

The present invention relates to a method and system for assessing bone age using deep neural network, more specifically, in which regions of interest (ROIs) even for rotated objects can be more precisely and accurately extracted from an image by a rotated object detection technique used in region proposal networks. Thereby bones with different angles in the image can be detected with excellent speed and accuracy.

4 Claims, 8 Drawing Sheets

(a) Not Considering Angles   (b) Considering Angles (a)                           (b)

Feature Map

METHOD AND SYSTEM FOR ASSESSING BONE AGE USING DEEP NEURAL NETWORK

BACKGROUND

The present invention relates to a method and system for assessing bone age using deep neural network, more specifically, in which regions of interest (ROIs) even for rotated objects are precisely and accurately extracted from an image by a rotated object detection technique used in region proposal networks. Thereby bones with different angles in the image can be detected with excellent speed and accuracy. Not extracting multiple ROIs directly, but multiple bounding ROIs (i.e., bROIs), in which each bROI includes at least more than one of ROIs for each part in the X-ray image, are extracted through two steps, and then actual ROIs from each bROI are extracted. Bone age for each accurately extracted ROI are assessed with deep convolutional neural networks.

Bone age is an indicator of the skeletal and biological maturity of an individual, which is different from chronological age calculated using the date of birth. Bone age is often requested for comparison with chronological age in order to diagnose diseases. Thus, Bone age assessment is a common clinical practice to investigate endocrinology, genetic and growth disorders.

There have been great advancements in radiological techniques over the past few decades but to date, plain radiographs of the hand are the investigation of choice for bone age assessment. Hand radiographs are quite safe to obtain as the effective dose of radiation received during each exposure.

Although there is no standardized method for bone age assessment, the Greulich-Pyle (GP) method and the TW (Tanner-Whitehouse) method are the most commonly used methods in clinical practice.

Bone age in GP method using an atlas is calculated by comparing the left wrist radiographs of the subject with the nearest matching reference radiographs provided in the atlas which are standard for different ages provided in the atlas. It contains reference images of male and female standards of the left wrist and hand from birth till 18 years for females and 19 years for males. Also, explanation regarding the gradual age-related changes observed in the bone structure is provided with each standard image. This method is simpler and faster than other radiograph-based methods. it may also be difficult to assess bone age accurately in current children using the GP method.

The Tanner &Whitehouse (TW) method in contrast is not based on the age, rather it is based on the level of maturity for 20 selected regions of interest (ROI) in specific bones of the wrist and hand in each age population. A numerical score is given to each stage of development for each bone individually. By summing up all these scores from the ROIs, a total maturity score is calculated. This score is correlated with the bone age separately for males and females. TW method is comparatively more complex and requires more time. However, it is more accurate and reproducible when compared to GP method.

Bone age assessment can be performed by a typical object detection and classification techniques that would benefit from deep learning. Convolutional neural networks (CNNs) are hence increasingly used for automating bone age assessment, and they have shown promising results. Object detection techniques used in deep neural networks are described in detail as follows.

For an example, a novel TW3-based fully automated bone age assessment system using deep neural networks is believed to be a complete end-to-end system to automate the entire process of the TW3 method, starting from localization of the epiphysis-metaphysis growth regions of multiple ROIs and ending with estimation of the corresponding bone age. The techniques based on CNNs and region-based CNNs (R-CNNs) for the classification of the maturity level of an ROI and the localization of the epiphysis-metaphysis growth regions of ROIs, respectively need to be developed.

There have been studies actively underway to distinguish which objects are in an image through deep learning technique. Recently, object detection techniques are used for classifying various objects in an image all together, and objects are accurately classified even for overlapped areas in the image according to data learning techniques.

However, traditional object detection techniques try to detect objects without considering directionality when detecting objects. More specifically, it means that when detecting objects in an image, even the pixels of unnecessary background, other than the actual object to be detected, are included in the bounding box. Especially, it may be difficult to visually identify whether an object is accurately detected or not in a situation where objects in an image are closely overlapped.

As stated above, the present invention utilizes CNNs and region-based CNNs (R-CNNs), and the feature maps of input images are extracted through convolutional neural networks. Objects are detected by using the feature maps. In Faster R-CNN (Region based CNN) which is one of the representative object detection techniques, the feature maps after processing CNN are applied to region proposal networks. After R-CNN, the expected bounding boxes are drawn with different sizes, and they go through the process to be pooled with a constant size for applying from an ROI pooling/aligning layer to fully connected layers.

At this time, the expected bounding boxes are drawn at the place where the objects are likely to be located, and there is almost nearly no feature (information) for surroundings of the objects beside the features of the objects which are likely to be detected.

However, there might be difficulty in detecting the object accurately, if there are objects that are not likely to be detected in the expected bounding boxes and have similar features to those of the objects which are not likely to be detected in the expected bounding boxes.

For the purpose of solving the above difficulties, the present invention provides a method and system for bone age assessment using deep neural network, more specifically, in which objects can be more precisely detected by enabling anchor boxes to be set by directional expected bounding boxes in addition to non-directional expected bounding boxes determined with different sizes and aspect ratios in region proposal neural network providing expected bounding boxes at the places where objects are expected to be located.

Hereinafter, the prior arts related to the present invention of a method for detecting objects through rotated anchor boxes and apparatus thereof are simply explained, and then the technical features that the present invention is differentiated from the prior arts will be described in detail as follows.

U.S. Pat. No. 10,262,235 B1 (Apr. 16, 2019) discloses a method of identifying and recognizing characters using a dual-stage neural network pipeline, the method discloses a technical feature for providing sub-image data comprising the rotated identified tiles of the image data to a convolutional recurrent neural network.

Even this prior art provides sub-image data comprising the rotated identified tiles of the image data to a convolutional recurrent neural network, it is different from the present invention in that the prior art technology is for identifying and recognizing characters and applying identified tiles of the image data to the recurrent neural network.

U.S. Pat. No. 10,242,293 B2 (Mar. 26, 2019) relates to a method for computing a bone age using a deep neural network, in which a method for computing a bone age using a deep neural network, including: receiving an analysis target image that is a specific medical image to compute the bone age; and analyzing the analysis target image by at least one computer using the deep neural network to compute the bone age.

Even this prior art provides a feature extraction layer with a structure in which a convolution layer that creates a feature map by applying a plurality of filters to each area of an image and a pooling layer that enables to extract a feature which is not changed over a change in position or rotation by spatially integrating the feature map are alternately repeated several times, the present invention provides detecting objects through rotated anchor boxes in faster R-CNN. Thus, rotations in the prior art technique are quite different from that of the present invention.

As described above, most of the prior arts disclosed before filing of the present invention has simply utilized convolutional neural network, convolutional recurrent neural network, R-CNN, fast R-CNN, faster CNN and so on, and has not provided the technical features of the present invention, which utilizes rotated bounding boxes (ROIs) fit for bone age assessment.

Since some of objects to be detected for bone age assessment are inclined, the prior arts can not be properly used for detecting bone objects using a region proposal CNN.

SUMMARY

To solve the above conventional problems, the objective of the present invention is to provide a method and apparatus for bone age assessment using deep neural network, in which objects can be more precisely detected by enabling anchor boxes to be set by directional expected bounding boxes in addition to non-directional expected bounding boxes determined with different sizes and aspect ratios in region proposal neural network providing expected bounding boxes at the places where objects are expected to be located.

In addition, another objective of the present invention is to provide assessing bone age using deep neural network, in which regions of interest (ROIs) even for rotated objects are precisely and accurately extracted from an image by a rotated object detection technique used in region proposal networks.

In addition, another objective of the present invention is to provide a method to detect bones with different angles in the image with excellent speed and accuracy. Not extracting multiple ROIs directly, but multiple bounding ROIs (i.e., bROIs), in which each bROI includes at least more than one of ROIs for each part in the X-ray image, are extracted through two steps, and then actual ROIs from each bROI are extracted.

To achieve the objectives, the present invention provides a method for bone age assessment, comprising: receiving, by a bone age assessment system, an image to assess the bone age; generating, by the bone age assessment system, feature maps via convolutional neural network; and generating, by the bone age assessment system, at least more than one of ROIs (Regions of Interest) with region proposal network; wherein the ROIs comprises at least more than one of rotated ROIs, which are rotated by at least more than one of different angles.

Wherein the ROIs are extracted via a two-step ROIs extraction method, in which bROIs are extracted at first as global features from the feature maps, and then the ROIs included in each bROI are extracted.

In addition, the method further comprising: performing, by the bone age assessment system, a ROI pooling/aligning using the ROIs and the feature maps; and generating, by the bone age assessment system, feature vectors. the method further comprising: performing, by the bone age assessment system, a max pooling for the feature vectors using fully connected layers; and classifying, by the bone age assessment system, bone maturity levels and positions of the ROIs.

Wherein the sizes of the bROIs including multiple ROIs are increased vertically to real object direction by constant ratios. RoI aligning is performed for the bROIs whose sizes are increased, wherein the ROI aligning is performed by binary interpolation, which is calculated for subcells of each of the ROIs by less than a pixel unit at the actual pixel position of the ROI, and then max pooling is performed for the binary interpolated subcells, wherein a value of each subcell in each ROI in the binary interpolation is calculated by weighed sum of pixels in columns surrounding the subcell.

Moreover, the present invention provides a platform for providing bone age assessment, comprising: a bone age assessment system, wherein the bone age assessment system is configured to: receive an image to assess the bone age from a user; generate feature maps from the input image with convolutional neural network; and generate at least more than one of ROIs (Regions of Interest) with region proposal network; wherein the ROIs comprises at least more than one of rotated ROIs, which are rotated by at least more than one of different angles.

The bone age assessment system is further configured to: perform a ROI pooling/aligning using the ROIs and the feature maps; and generate feature vectors.

The bone age assessment system is further configured to: perform a max pooling for the feature vectors using fully connected layers; and classify bone maturity levels and positions of ROIs.

Hence, according to the present invention as described above and afterwards, the feature vector can be excellently extracted even for having various directional ROI's due to the different shapes and directions of bones for a part of a human body.

It is possible to assess an accurate bone age by using accumulated big data even for various races as well as both of males and females. The accurate bone age can be assessed through rotated ROI bounding boxes. The assessed bone age casts a lot of direct and indirect hints and messages for diagnosing diseases.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION OF EXEMPLARY EMBODIMENTS

Hereinafter, exemplary embodiments of the present invention are explained in detail with reference to accompanying figures. The same reference sign in each figure represents the same component. In addition, the specific structural or functional explanation for embodiments of the present invention is used for exemplifying the embodiments only and all the terms including technical and scientific terms used in this document have the same meaning, unless defined differently, as the meaning generally understood by those who have ordinary knowledge in the technical area the present invention belongs to.

The present invention provides a technique for detecting rotated objects by adding rotation anchors (ROIs) in region proposal networks of faster R-CNN. Where, angle parameter is added to the existing bounding boxes, and rotation ROI pooling/aligning layer is added for pooling the rotated bounding boxes. The features after rotating a sub-region until the corresponding sub-region becomes vertical in the feature map are stored and the rotated ROI pooling/aligning layer performs max pooling or aligning by binary interpolation for the stored features.

The present invention applies this technique to SSD in extracting bRoIs before extracting multiple RoIs. Wherein a technique for detecting objects in images using a single deep neural network, named as SSD, discretizes the output space of bounding boxes into a set of default boxes over different aspect ratios and scales per feature map location. At prediction time, the network generates scores for the presence of each object category in each default box and produces adjustments to the box to better match the object shape. Additionally, the network combines predictions from multiple feature maps with different resolutions to naturally handle objects of various sizes.

There are a variety of methods for extracting multiple RoIs from the TW3 based bone age assessment system. However, as mentioned above, extracting multiple RoIs from the left-hand X-ray image directly has a performance degradation in the bone age assessment system.

Therefore, the present invention provides to extract multiple RoIs in two steps. rough regions, bROIs (bounding ROIs) containing more than one of RoIs are extracted first, and then RoIs included in each bROI are extracted. Hereinafter, the details would be explained.

Figure 1:
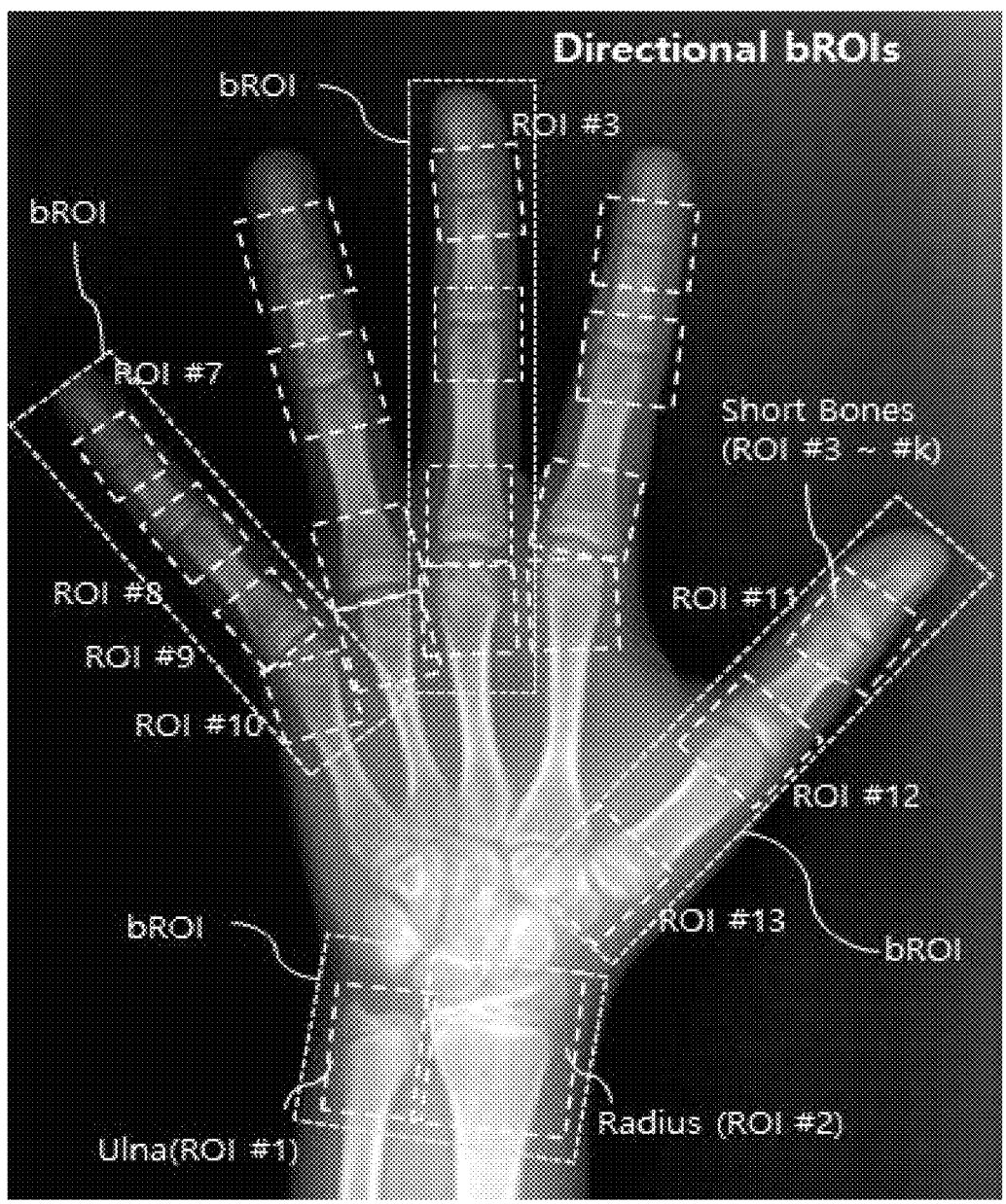
FIG. 1 shows ROIs of left hand used for bone age assessment in accordance with an embodiment of the present invention.

FIG. 1 shows ROIs of left hand used for bone age assessment in accordance with an embodiment of the present invention.

As shown in FIG. 1, Radius, Ulna and Short bones (RUS) are used in recently developed TW3, which is a method for assessing bone age by summing scores of bone maturity of each part in the image of a left hand. Since the maturity of each bone is assessed by scores, whole mismatches among individual bones can be minimized, and thus objective evaluation is possible.

It is important to accurately extract multiple RoIs in TW3 based bone age assessment using deep neural network. There are various ways to extract the above multiple ROIs. Multiple ROIs can be directly extracted from left hand X-Ray image. However, this approach has disadvantages of degrading performance of bone age assessment due to the difficulties of discriminating ROIs which are similar shapes.

Traditional object detection methods use the bounding box (bbox) to find the target object in the image. The bbox is a parameterized square with four variables of center point position and width and height. The bbox has difficulties in finding objects with different directional angles. The bboxes in FIG. 2(a) are four bRoIs with 13 RoIs. In this situation, the bbox can not provide the exact size of the object and the surrounding information that is not needed is included in the bbox. When extracting bRoIs to extract 13 RoIs from the bone age assessment system, the corresponding bRoIs cannot be extracted vertically to real object directions, which can lead to a large performance degradation.

In the present invention, the rotated default bounding boxes are introduced as shown in FIG. 2(b). The rotated default bounding boxes are rectangles with angle parameters that define the direction. This overcomes the disadvantage that existing bRoIs include surrounding information by extracting bRoIs considering angles with rotated default bounding boxes as shown in FIG. 2(b). Therefore, a rough region including multiple ROIs is extracted at first and then real accurate multiple ROIs are extracted. That is, search space is reduced for extracting multiple ROIs.

Figure 2:
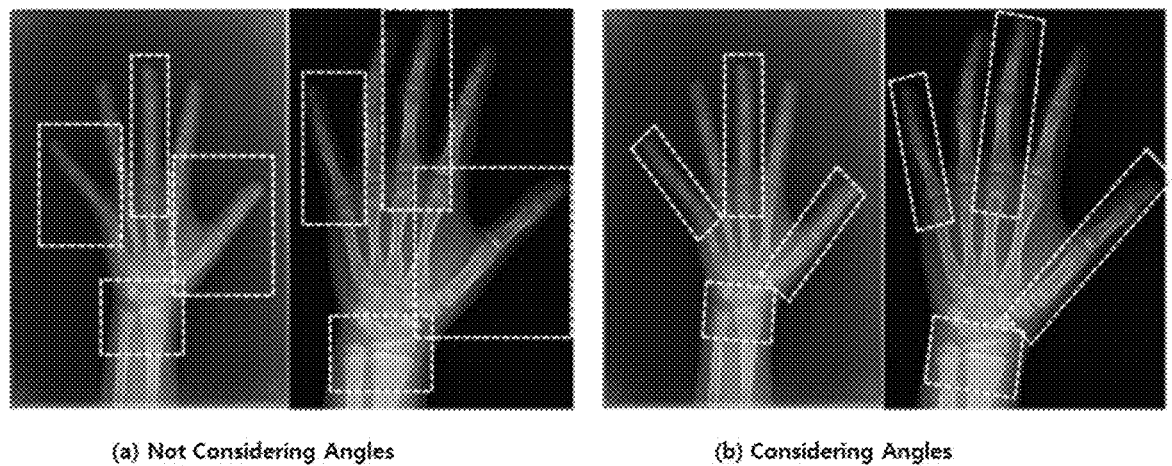
FIG. 2 shows examples of extracting bROIs of left hand used for bone age assessment in accordance with an embodiment of the present invention.

The rough region is called as bounding ROIs (bROIs), as shown in FIGS. 1 and 2. And the multiple ROIs included in each of bROIs can be selected as 13 ROIs, for an example, Ulna (ROI #1), Radius (ROI #2), Third Distal Phalanx (ROI #3), Third Middle Phalanx (ROI #4), Third Proximal Phalanx (ROI #5), Third Metacarpal (ROI #6), Fifth Distal Phalanx (ROI #7), Fifth Middle Phalanx (ROI #8), Fifth Proximal Phalanx (ROI #9), Fifth Metacarpal (ROI #10), First Distal Phalanx (ROI #11), First Proximal Phalanx (ROI #12), First Metacarpal (ROI #13).

The present invention provides a method for extracting accurate ROIs in bone age assessment based on TW3 using deep learning by referring to the method that a rough region including multiple (i.e., 13) ROIs is extracted first and then real accurate multiple ROIs are extracted. Especially, in the process of extracting bROIs using object detection technique, bROIs are extracted in considering rotated versions of existing rectangular shapes.

One of representative object detection techniques, SSD (Single Shot Detector), estimates category score and box offsets for fixed default bounding boxes using small size convolutional filters adopted to feature maps. As stated above, the technique for detecting objects in images using a single deep neural network (SSD), discretizes the output space of bounding boxes into a set of default boxes over different aspect ratios and scales per feature map location. At prediction time, the network generates scores for the presence of each object category in each default box and produces adjustments to the box to better match the object shape. Additionally, the network combines predictions from multiple feature maps with different resolutions to naturally handle objects of various sizes.

The default bounding boxes composed of different aspect ratios like anchor boxes used in region proposal networks of Faster R-CNN are applied to every grid center of each feature map. The key idea of the present invention is to accurately detect even rotated objects in considering angles by learning the coordinate information (x, y, w, h, a) to which an angle is added at the coordinate information (x, y, w, h) of the default bounding boxes.

Figure 3:
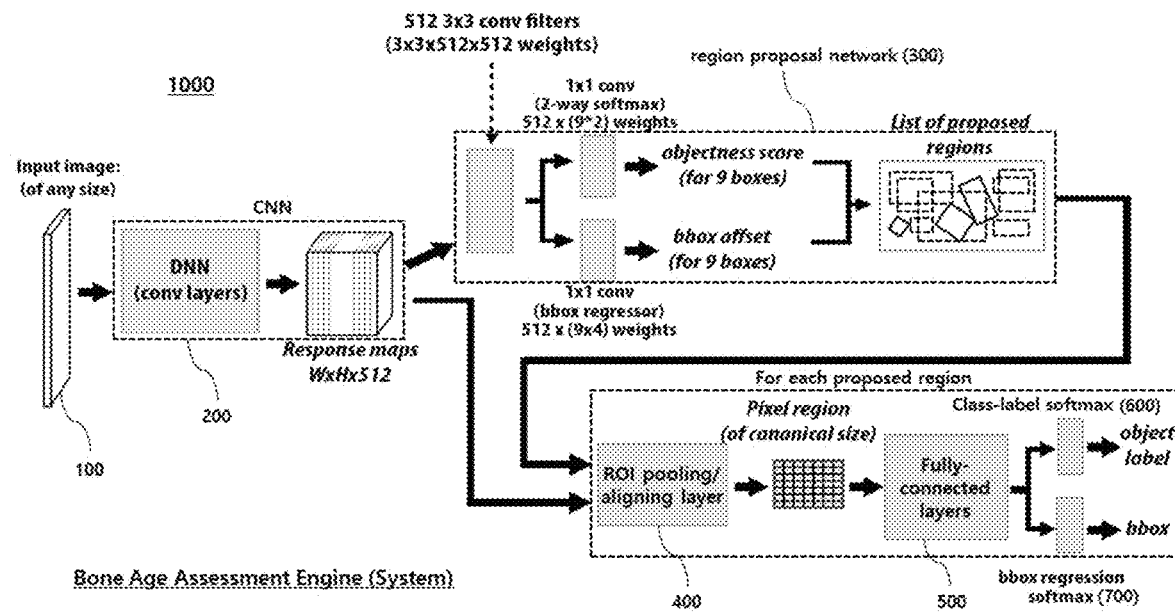
FIG. 3 shows an architecture for Faster R-CNN (Region based CNN (Convolutional Neural Network)) adopting rotated ROI bounding boxes in accordance with an embodiment of the present invention.

FIG. 3 shows an architecture for Faster R-CNN (Region based CNN (Convolutional Neural Network)) adopting rotated ROI bounding boxes in accordance with an embodiment of the present invention.

As shown in FIG. 3, an apparatus for detecting objects using deep neural network through rotated anchor boxes comprises a CNN module 200, a region proposal network 300, and ROI pooling/aligning layer 400, and fully connected layers 500. The ROI pooling/aligning layer 400, fully connected layers 500, class-label softmax 600 and bbox regression softmak 700 are performed for each proposed region. The procedures shown in FIG. 3 are processed twice for bROIs detection at first and then ROIs included in each bROI are secondly detected. The detection of ROIs after detecting bROIs is processed by typical object detection method.

Pre-trained convolutional neural networks (CNN) generate feature maps, when images composing with RGB colors are inputted to the pre-trained CNN. The CNN module 200 comprises deep neural networks (DNN) with multiple convolution layers and generates feature maps as responses of the DNN.

The feature maps are inputted to the region proposal network 300, and expected bounding boxes are drawn at the place where objects are likely to be located.

At this time, each bounding box has information with respect to whether it is an object or not and the coordinates at which the bounding box is located. An n×n window slides on a feature map in the region proposal neural networks, and when the window slides, k anchor boxes which are used for candidate of bounding boxes are drawn at each pixel.

For examples, total 9 anchor boxes in Faster R-CNN can be decided with 3 different sizes (128, 256, 512), and 3 different aspect ratios (2:1, 1:1, 1:2). For each anchor box, feature vector is generated through the computation for each sliding window, and the position and size of each expected bounding box and the anticipated score of corresponding expected bounding box are computed through two fully connected layers (Classification Layer, Regression Layer) using the above generated feature vectors.

In order to reject unnecessary expected bounding boxes, IoU (Intersection of Union) is set by ascending order for the anticipated score of the expected bounding box, and the expected bounding boxes in which IoU is lower than 0.7 are rejected.

IoU between two rotated default bounding boxes A and B is defined as Equation (1).

$$IoU\ (A, B) = \frac{\text{area}\ (A \cap B)}{\text{area}\ (A \cup B)} \quad (1)$$

where $\cup$ and $\cap$ are Boolean operations between two rotated default bounding boxes. IoU is used as a criterion for selecting a positive sample of rotated default bounding boxes during training, thus helping the corresponding rotated default bounding boxes to be correctly regressed. Rotated default bounding boxes can also be used for various object detection techniques, such as anchor boxes in Region Proposal Networks (RPNs), that draw expected bounding boxes at potential objects.

Figure 4:
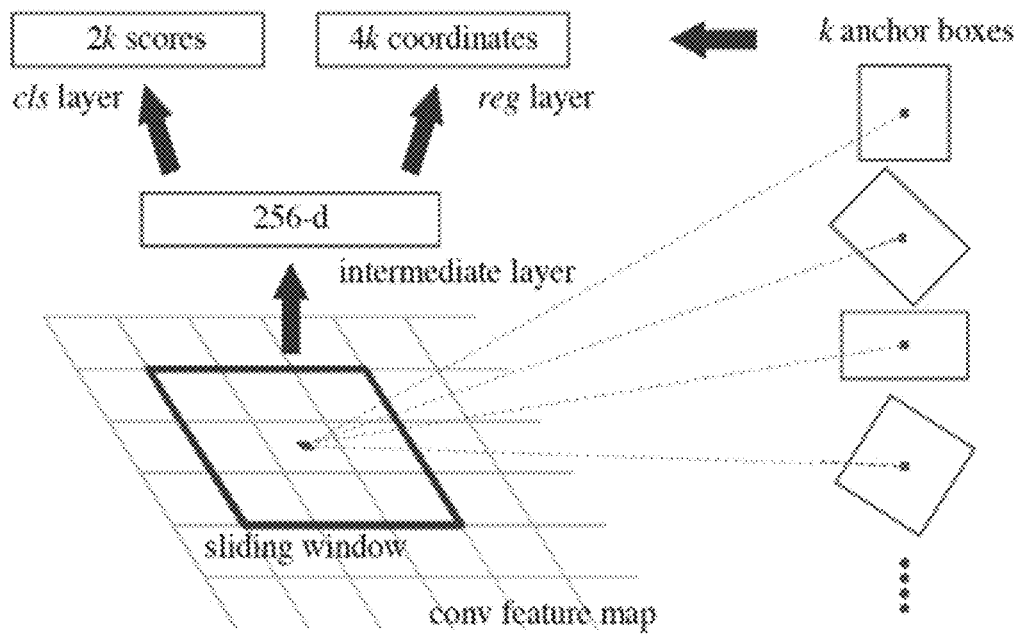
FIG. 4 shows a process of detecting rotated objects in region proposal neural networks in accordance with an embodiment of the present invention.

FIG. 4 shows a process of detecting rotated objects in region proposal neural networks in accordance an embodiment of the present invention.

As shown in FIG. 4, in region proposal neural network, the expected bounding boxes with different sizes drawn in a feature map are adjusted to the same size in Region of Interest (ROI) Pooling/aligning layer, then the adjusted expected bounding boxes are inputted to fully connected layers. The results of ROI pooling/aligning layer are divided into sections fit to the size of inputs which fully connected layers at the place of the expected bounding boxes, and thus maximum feature values in each section are pooled (i.e., max pooling is performed). When each section is divided, it is not necessarily to pool the same pixel.

The proposed techniques for detecting rotated bounding boxes in accordance with the present invention are explained in detail. Firstly, rotated anchor box is added for the rotated object detection. In Faster R-CNN, which is a region proposal neural networks for drawing the expected bounding boxes at the place where an object is likely to be, k anchor boxes are decided by considering different sizes and aspect ratios. If the anchor boxes are decided by considering different angles in addition to the different sizes and aspect ratios, the directional rotated expected bounding boxes in addition to the traditional non-directional expected bounding boxes are drawn. Thus, the anchor boxes can be references for detecting objects.

Figure 5:
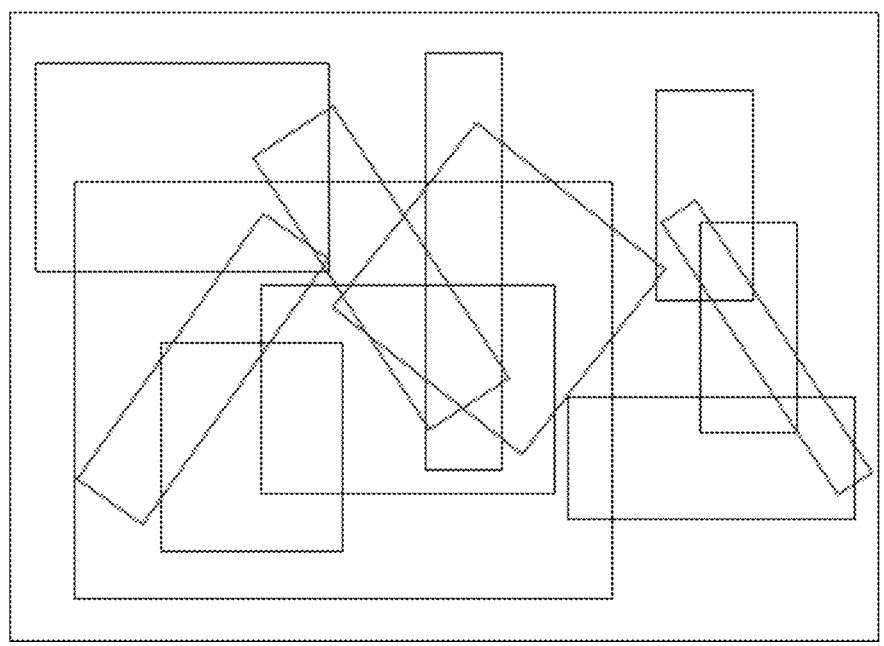
FIG. 5 shows an exemplary diagram for the expected bounding boxes generated in a feature map in accordance with an embodiment of the present invention.

FIG. 5 shows an exemplary diagram for the expected bounding boxes generated in a feature map in accordance with an embodiment of the present invention.

The idea provided in the present invention can be applied to all the object detection techniques utilizing anchor boxes. The present invention provides an embodiment applying the idea to faster R-CNN.

If considering different angles, for an example, 30 and −30 degrees, the number of anchor boxes generated for a pixel in sliding window can be 27 in total (3 different sizes multiply by 3 different aspect ratios multiply by 3 different angles). In the region proposal neural network, position and size (center of x coordinate, center of y coordinate, horizontal width w, vertical length h) of existing expected bounding boxes are inputted to regression layer of two fully connected layers, then angles as well as positions and sizes of the expected bounding boxes proposed in the present invention are inputted to the regression layer.

In the regression layer, the position of the expected bounding box is adjusted through learning the position and size of the expected bounding boxes. Likewise, when learning more for angles, the predicted bounding box drawn for the place where the object is likely to be not only at the position and the size, but also at an angle, can be adjusted to the correct place.

Figure 6:
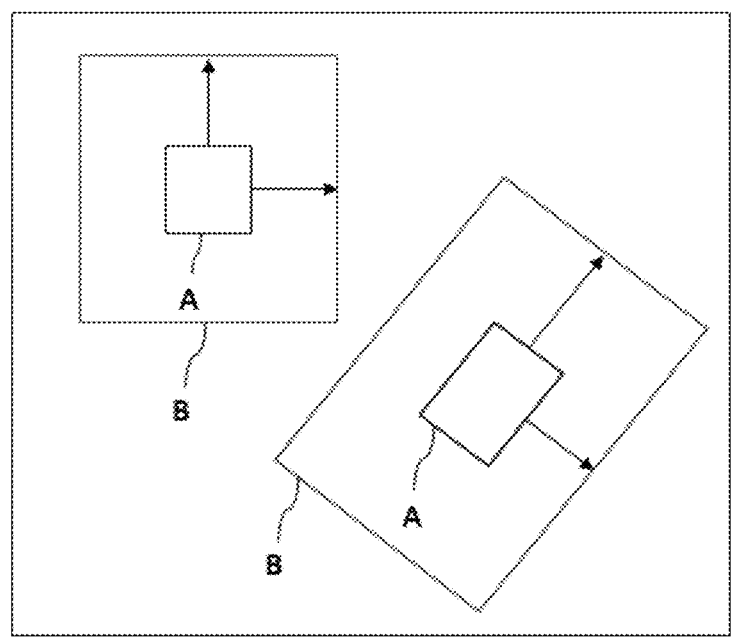
FIG. 6 shows an exemplary diagram for global feature extraction and RoI aligning in accordance with an embodiment of the present invention.

FIG. 6 shows an exemplary diagram for global feature extraction and ROI aligning in ROI aligning layer 400 in accordance with an embodiment of the present invention. There are at least one of the layers selected from the groups comprising the ROI aligning layer, the ROI pooling layer, or the combinations thereof in 400.

Each of the expected bounding boxes selected through IoU (Intersection of Union) has different position and size in the feature map produced from region proposal neural networks.

Figure 9:
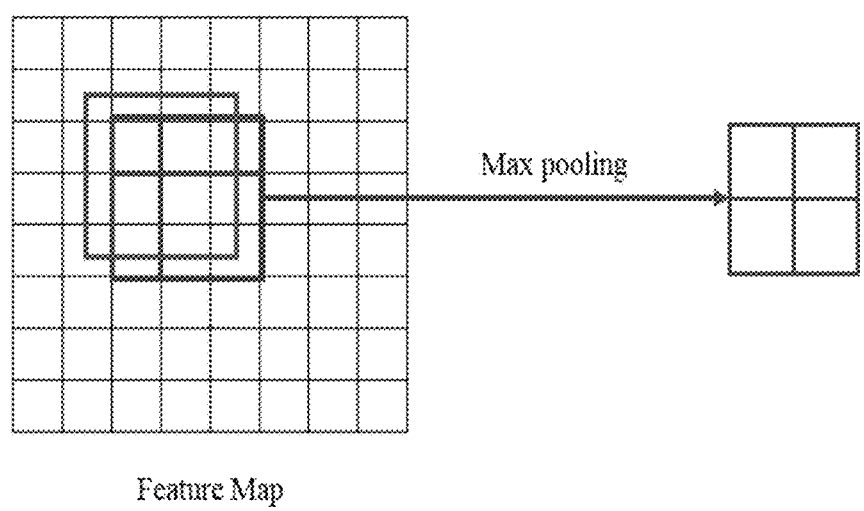
FIG. 9 shows a process of ROI pooling in accordance with an embodiment of the present invention.
Figure 10:
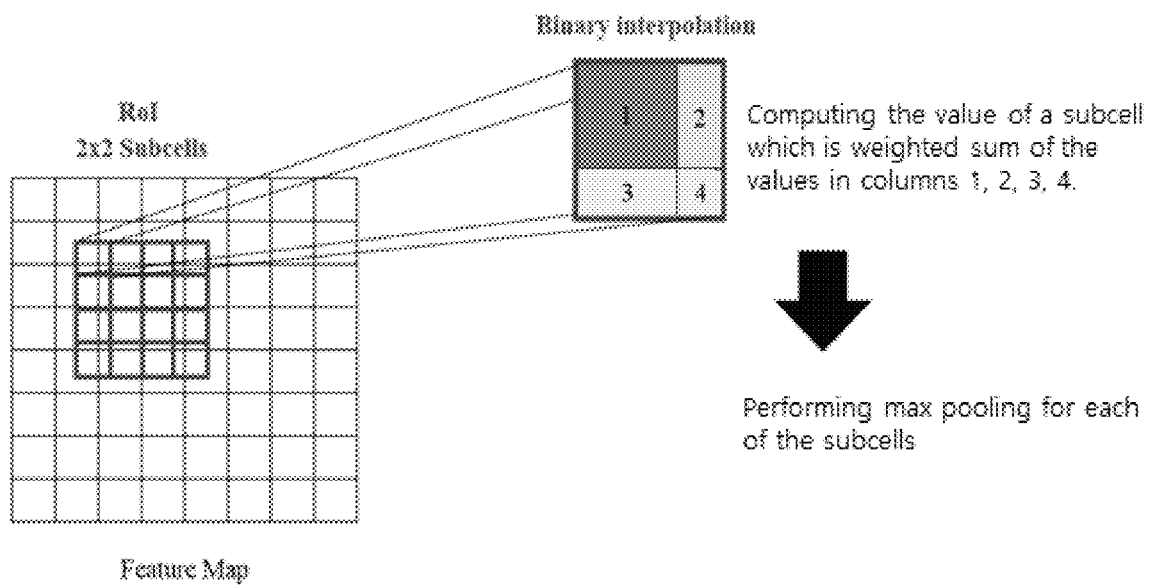
FIG. 10 shows a process of ROI aligning in accordance with an embodiment of the present invention.

The present invention provides that the size of the expected bounding box calculated in region proposal neural networks is increased by a certain ratio, and the expected bounding box whose size is increased is subjected to RoI aligning process by ROI aligning layer 400 instead of RoI pooling process by ROI pooling layer (referring to FIGS. 9 and 10). ROI pooling layer or ROI aligning layer 400 is selectively adapted to the bone age assessment system in accordance with the present invention.

First, the size of the expected bounding box (B) is the one increased with a certain ratio from that of the actual bounding box (A) that has been drawn, as shown in FIG. 6.

Figure 7:
FIG. 7 shows global feature extraction scenarios as examples in accordance with embodiments of the present invention.
Figure 7:
Figure 8:
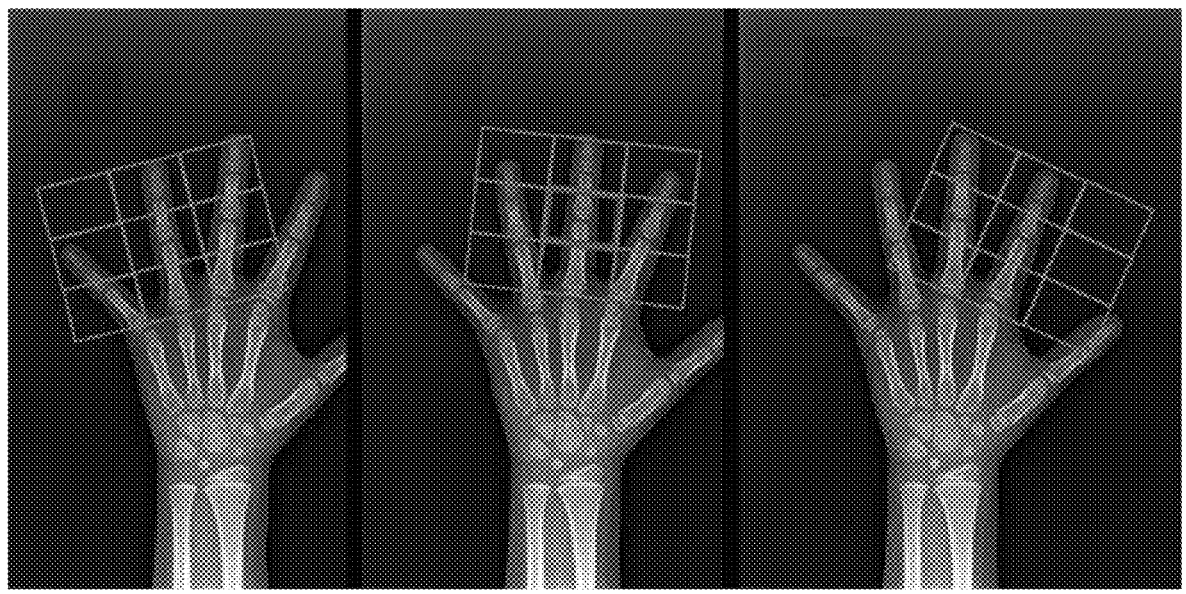
FIG. 8 shows a global feature extraction scenario as an example in accordance with embodiments of the present invention.

When the corresponding process is performed, the expected bounding box contains the position of an actual object and the surrounding feature (information) of the above actual object. If so, when the classification is performed for the object in the fully connected layer, performance may be better because the surrounding features are also considered together.

Wherein the expected bounding box contains global feature surrounding actual bounding box, under the scenarios shown in FIGS. 7 to 8.

FIG. 7 shows global feature extraction scenarios as examples in accordance with embodiments of the present invention.

As shown in FIG. 7(a), suppose to try to find a bone located at the second and third joint of the middle finger (i.e., indicated border) in an X-ray image of the hand. In the existing region proposed neural networks, the expected bounding boxes (i.e., boxes located at the left and right sides of the corresponding box) can also be drawn at the places where there are similar features to those of the corresponding object, as shown in FIG. 7(b). When this kind of situation occurs, the corresponding expected bounding boxes in the fully connected layer can all be identified as the bone located between the second and third joint of the middle finger. The present invention provides a solution of the above problem as follows.

FIG. 8 shows a global feature extraction scenario in accordance with an embodiment of the present invention.

As shown in FIG. 8, the existing expected bounding box (i.e., the box located at center position) is corrected by increasing the existing actual bounding box to the expected bounding boxes whose size is increased at a certain rate.

Moreover, the present invention can use ROI aligning instead of ROI pooling for the expected bounding boxes whose size are increased at a certain rate. ROI pooling and ROI aligning are respectively explained in detail by referring FIG. 9 and FIG. 10.

FIG. 9 shows a process of ROI pooling in accordance with an embodiment of the present invention. FIG. 10 shows a process of ROI aligning in accordance with an embodiment of the present invention.

As shown in FIG. 9, the position of the expected bounding box is adjusted by moving it to another position by a pixel unit in the feature map, rather than the position of the actual expected bounding box position, and then max pooling is performed.

However, in case of ROI aligning, as shown in FIG. 10, the max pooling is performed as is at the position of the actual expected bounding box. Binary interpolation is adopted for ROI aligning, as the pixel position of the expected bounding box is at the position remained with the coordinate less than a full pixel unit (i.e., half pixel or floating point). Thereby, the accuracy for coordinates of the predicted bounding box is greatly improved.

As stated above, the processes of bone age assessment in accordance of the present invention are summarized as two-step ROI extraction processes, which are explained as follows.

Figure 11:
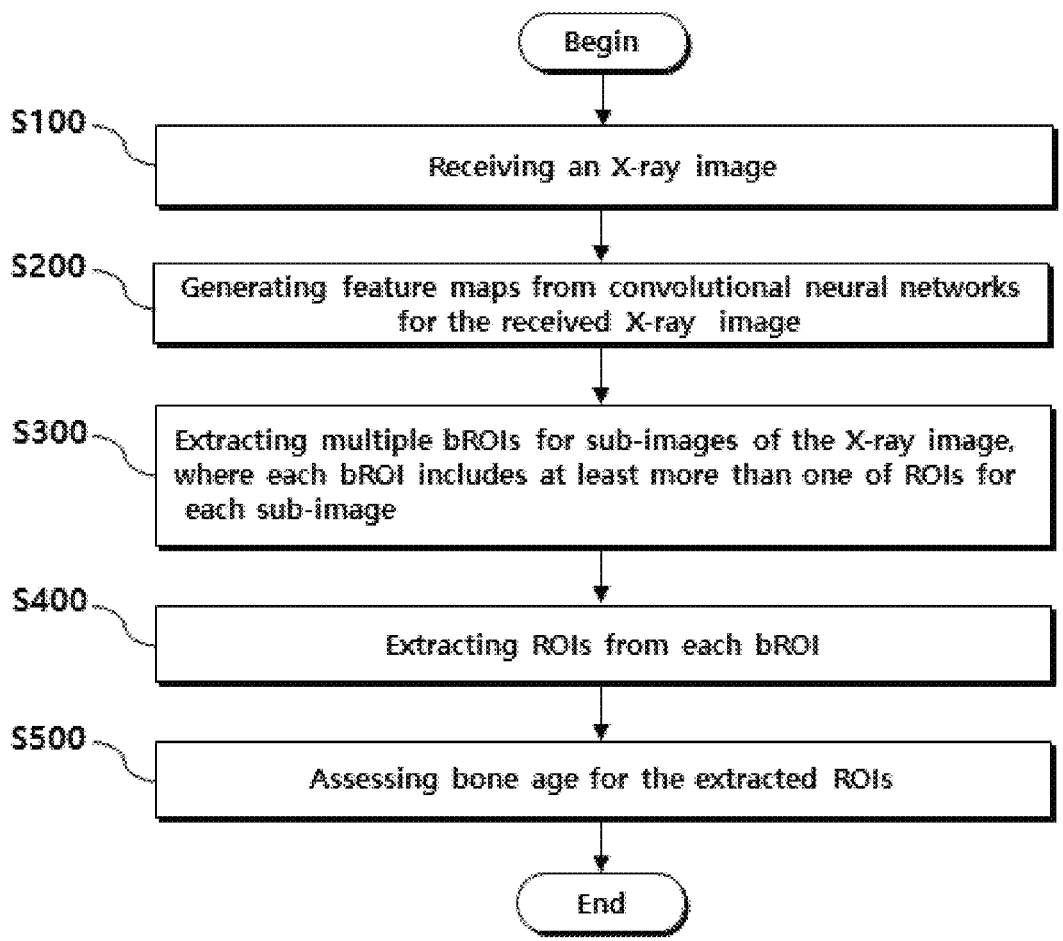
FIG. 11 shows a flowchart of performing bone age assessment in accordance with an embodiment of the present invention.

FIG. 11 shows a flowchart of performing bone age assessment in accordance with an embodiment of the present invention.

In bone age assessment system, an X-ray image starts to be received in S100. A user can provide his own X-ray image via a personal computer, a mobile terminal, etc. The inputted image is used for extracting feature maps using convolutional neural networks in step S200. The feature maps are used for extracting ROIs.

The present invention provides a two-step ROIs extraction method, in which bROIs are extracted at first from the feature maps in step S300, and then the ROIs included in each bROI are extracted in S400. Multiple bROIs for sub-images of the X-ray image are extracted by using the feature maps, where each bROI includes at least more than one of ROIs for each sub-image.

In step S500, bone age of a user is assessed for the extracted ROIs. These processes are performed in the bone age assessment system or engine.

From now on, the bone age assessment using deep neural network was explained. As expected, the bone age assessment system can be applied and utilized for generating various kinds of medical services, such as disease prediction service, aging prediction service, health prediction service, and health management service, etc.

Figure 12:
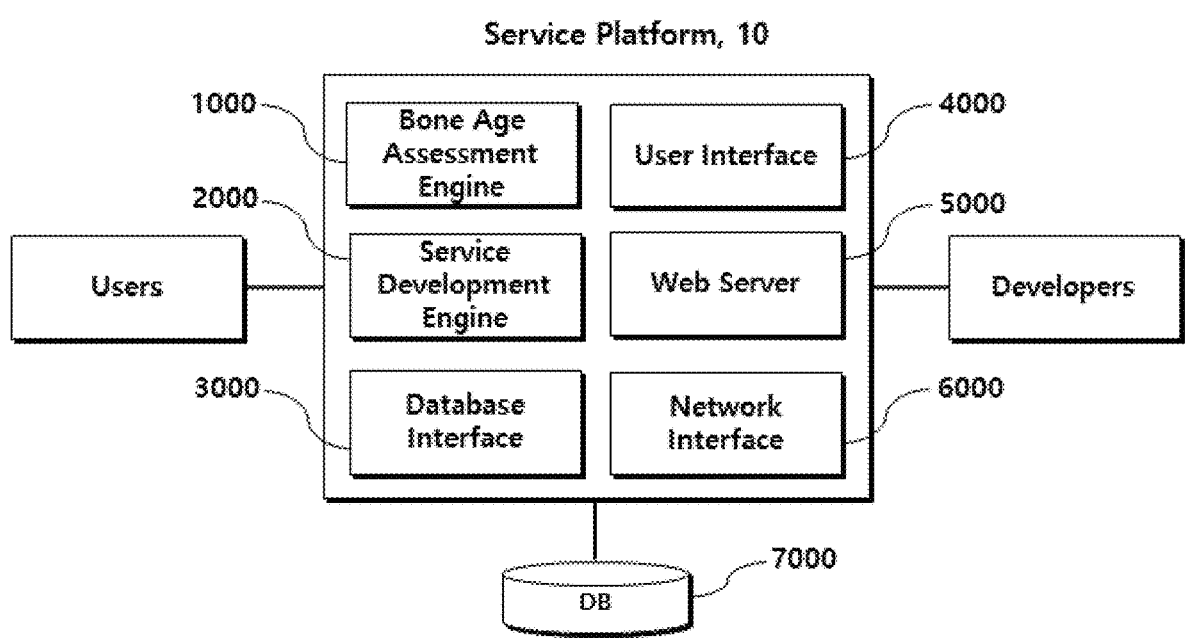
FIG. 12 shows a block diagram of a platform for providing bone age assessment in accordance with an embodiment of the present invention.

FIG. 12 shows a block diagram of a service platform for providing bone age assessment in accordance with an embodiment of the present invention.

As shown in FIG. 12, the service platform 10 comprises a bone age assessment engine (system) 1000, a service development engine 2000, a database interface 3000, a user interface 4000, a web server 5000, and a network interface 6000.

Basically, the present invention provides the bone age assessment engine (system), By using the engine, various services can be developed by developers under the environments provided from the platform 10.

Database interface 3000 provides the interfaces between database 7000 and the modules (from 1000 to 6000). User interface 4000 provides input and output interfaces to users and developers by using graphical user interface. Network interface 6000 provides network connections between devices which users and developers have.

Web server 5000 can provide a means for a user to access the service platform 10 via network. Most of users can use the service platform 10 via web server 5000 in a remote site.

As described above, a method for bone age assessment using region-based convolutional neural network in accordance with the present invention, comprises receiving, by a bone age assessment device, an image to assess the bone age, generating feature maps via convolutional neural network, generating at least more than one of ROI (regions of interest) bounding boxes via region proposal network, performing ROI pooling/aligning for the ROI bounding boxes and the feature maps, generating a feature vector, performing, by the bone age assessment device, max pooling for the feature vector via fully connected layers, and classifying bone maturity levels and positions of ROI bounding boxes, wherein at least more than one of the ROI bounding boxes are rotated by at least more than one of different angles.

Hence, according to the present invention as described above, the feature vector can be excellently extracted even for having various directional ROI's due to the different shapes and directions of bones for a part of a human body.

It is possible to assess an accurate bone age by using accumulated big data even for various races as well as both of males and females. The accurate bone age can be assessed through rotated ROI bounding boxes. The assessed bone age casts a lot of direct and indirect hints and messages for diagnosing diseases.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings, such as the bone age assessment engine (system) 1000, the service development engine 2000, the database interface 3000, etc., in FIG. 12 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The present invention has been described with reference to an embodiment shown in the figures, which is an exemplification only and the various and equivalent embodiments are made possible by those who have ordinary knowledge in the area the present invention belongs to. Therefore, the technical scope of the present invention will be determined by the claims as follows.

What is claimed is:

1. A method for bone age assessment, comprising:
receiving, by a bone age assessment system, an image to assess a bone age;
generating, by the bone age assessment system, feature maps for the received image through convolutional neural networks;
generating, by the bone age assessment system, at least one of proposed regions of interest (ROIs) using the generated feature maps through region proposal networks;
performing, by the bone age assessment system, at least one of ROI pooling in an ROI pooling layer and ROI aligning in an ROI aligning layer using the proposed ROIs and the generated feature maps;
generating, by the bone age assessment system, feature vectors;
performing, by the bone age assessment system, max pooling for the feature vectors using fully connected layers; and
classifying, by the bone age assessment system, bone maturity levels and positions of the proposed ROIs,
wherein the proposed ROIs comprise a plurality of rotated ROIs, which are rotated by a plurality of different angles,
wherein the proposed ROIs are extracted via a two-step ROIs extraction method, in which bounding ROIs (bROIs) are extracted at first for global features from the feature maps, and then the proposed ROIs included in each bROI are extracted,
wherein the ROI aligning is performed for the bROIs whose sizes are increased,
wherein the ROI aligning is performed by binary interpolation, which is calculated for subcells of each of the proposed ROIs by less than a pixel unit at an actual pixel position of the proposed ROIs, and then max pooling is performed for the binary interpolated subcells, and
wherein a value of each subcell in each proposed ROI in the binary interpolation is calculated by weighed sum of pixels in columns surrounding the subcell.

2. The method of claim 1, wherein sizes of the bROIs including two or more proposed ROIs are increased vertically to real object directions by constant ratios.

3. A bone age assessment system comprising at least one processor configured to:
receive an image to assess a bone age;
generate feature maps for the received image from the image through convolutional neural networks;

generate at least one of proposed regions of interest (ROIs) using the generated feature maps through region proposal networks;

perform at least one of ROI pooling in an ROI pooling layer and ROI aligning in an ROI aligning layer using the proposed ROIs and the generated feature maps;

generate feature vectors;

perform max pooling for the feature vectors using fully connected layers; and classify bone maturity levels and positions of the proposed ROIs, wherein the proposed ROIs comprise a plurality of rotated ROIs, which are rotated by a plurality of different angles, wherein the proposed ROIs are extracted via a two-step ROIs extraction method, in which bounding ROIs (bROIs) are extracted at first for global features from the feature maps, and then the proposed ROIs included in each bROI are extracted, wherein ROI aligning is performed for the bROIs whose sizes are increased, wherein the ROI aligning is performed by binary interpolation, which is calculated for subcells of each of the proposed ROIs by less than a pixel unit at an actual pixel position of the proposed ROIs, and then max pooling is performed for the binary interpolated subcells, and wherein a value of each subcell in each proposed ROI in the binary interpolation is calculated by weighed sum of pixels in columns surrounding the subcell.

4. The system of claim 3, wherein sizes of the bROIs including two or more proposed ROIs are increased vertically to real object direction by constant ratios.

* * * * *